United States Patent
Pullela et al.

(10) Patent No.: US 7,313,667 B1
(45) Date of Patent: Dec. 25, 2007

(54) METHODS AND APPARATUS FOR MAPPING FIELDS OF ENTRIES INTO NEW VALUES AND COMBINING THESE MAPPED VALUES INTO MAPPED ENTRIES FOR USE IN LOOKUP OPERATIONS SUCH AS FOR PACKET PROCESSING

(75) Inventors: Venkateshwar Rao Pullela, San Jose, CA (US); Dileep Kumar Devireddy, San Jose, CA (US); Shyamsundar Rao Pullela, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1048 days.

(21) Appl. No.: 10/212,965

(22) Filed: Aug. 5, 2002

(51) Int. Cl.
*G06F 9/34* (2006.01)

(52) U.S. Cl. ............ 711/202; 370/399; 370/409; 370/395.32; 711/3; 711/216

(58) Field of Classification Search ........ 370/392–393, 370/395.3–395.32, 395.54, 465–466, 475–476; 711/104–141, 3, 202–209, 216; 709/245
See application file for complete search history.

(56) References Cited

U.S. PATENT DOCUMENTS

| | | | |
|---|---|---|---|
| 5,088,032 A | | 2/1992 | Bosack |
| 5,146,588 A | * | 9/1992 | Crater et al. .......... 714/6 |
| 5,319,763 A | | 6/1994 | Ho et al. |
| 5,481,540 A | | 1/1996 | Huang |
| 5,515,370 A | | 5/1996 | Rau |
| 5,604,882 A | * | 2/1997 | Hoover et al. .......... 711/121 |
| 5,740,171 A | | 4/1998 | Mazzola et al. |
| 5,842,040 A | | 11/1998 | Hughes et al. |
| 5,898,689 A | | 4/1999 | Kumar et al. |
| 5,920,886 A | | 7/1999 | Feldmeier |
| 5,930,359 A | | 7/1999 | Kempke et al. |
| 6,000,008 A | | 12/1999 | Simcoe |
| 6,061,368 A | | 5/2000 | Hitzelberger |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Chi Pham
*Assistant Examiner*—Thai Hoang
(74) *Attorney, Agent, or Firm*—The Law Office of Kirk D. Williams (57) ABSTRACT

Fields of entries are mapped into new values with these mapped values combined into mapped entries for use in lookup operations typically for packet processing. One implementation identifies a list including multiple items each having a first field and a second field. The unique first and second fields of each item are respectively mapped to mapped first and second fields. A first associative memory is programmed with the unique first fields, and a first stage memory is programmed with the mapped first fields at corresponding locations. A second associative memory is programmed with the unique second fields, a second stage memory is programmed with the mapped second fields at corresponding locations. A second stage associative memory is then programmed, using the mapped first and second fields, with entries corresponding to one or more of the original multiple items.

22 Claims, 7 Drawing Sheets

U.S. PATENT DOCUMENTS

| | | | |
|---|---|---|---|
| 6,091,725 | A | 7/2000 | Cheriton et al. |
| 6,097,724 | A | 8/2000 | Kartalopoulos |
| 6,141,738 | A | 10/2000 | Munter et al. |
| 6,148,364 | A | 11/2000 | Srinivasan et al. |
| 6,219,748 | B1 | 4/2001 | Srinivasan et al. |
| 6,236,658 | B1 | 5/2001 | Essbaum et al. |
| 6,237,061 | B1 | 5/2001 | Srinivasan et al. |
| 6,240,485 | B1 | 5/2001 | Srinivasan et al. |
| 6,243,667 | B1 | 6/2001 | Kerr et al. |
| 6,285,378 | B1 | 9/2001 | Duluk, Jr. |
| 6,289,414 | B1 | 9/2001 | Feldmeier et al. |
| 6,295,576 | B1 | 9/2001 | Ogura et al. |
| 6,308,219 | B1 | 10/2001 | Hughes |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,430,190 | B1 | 8/2002 | Essbaum et al. |
| 6,434,662 | B1 | 8/2002 | Greene et al. |
| 6,526,474 | B1 | 2/2003 | Ross |
| 6,535,951 | B1 | 3/2003 | Ross |
| 6,658,002 | B1 | 12/2003 | Ross et al. |
| 6,711,653 | B1 * | 3/2004 | Quach et al. ............... 711/146 |
| 6,768,992 | B1 * | 7/2004 | Jolitz ............................ 707/6 |
| 6,877,065 | B2 * | 4/2005 | Galbraith et al. .......... 711/113 |
| 6,889,225 | B2 * | 5/2005 | Cheng et al. ............... 707/100 |
| 7,002,965 | B1 * | 2/2006 | Cheriton ................ 370/395.32 |

OTHER PUBLICATIONS

Teuvo Kohonen, Content-Addressable Memories, 1987, pp. 128-129 and 142-144, Springer-Verlag, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "PATRICIA—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM Sigmetrics Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

| | ACTION | SOURCE ADDRESS | DESTINATION ADDRESS |
|---|---|---|---|
| 401 → | PERMIT | 10.1.1.100 | 20.1.100.10 |
| 402 → | PERMIT | 10.1.1.200 | 20.1.100.10 |
| 403 → | DENY | *.*.*.* | 20.1.100.10 |
| 404 → | PERMIT | 10.1.1.100 | 20.1.200.20 |
| 405 → | DENY | *.*.*.* | 20.1.200.20 |
| 406 → | PERMIT | 10.1.1.* | 20.1.100.* |
| 407 → | DENY | *.*.*.* | 20.1.100.* |
| 408 → | PERMIT | 10.1.1.* | 20.1.200.* |
| 409 → | DENY | *.*.*.* | 20.1.200.* |
| 410 → | PERMIT | 10.1.*.* | 20.1.*.* |
| 411 → | DENY | *.*.*.* | 20.1.*.* |
| 412 → | DENY | *.*.*.* | *.*.*.* |

PRIOR ART
ACL ENTRIES

FIGURE 4A

MAPPED ACL ENTRIES

METHODS AND APPARATUS FOR MAPPING FIELDS OF ENTRIES INTO NEW VALUES AND COMBINING THESE MAPPED VALUES INTO MAPPED ENTRIES FOR USE IN LOOKUP OPERATIONS SUCH AS FOR PACKET PROCESSING

FIELD OF THE INVENTION

This invention especially relates to computer and communications systems, especially routers and switches; and more particularly, the invention relates to mapping fields of entries into new values and combining these mapped values into mapped entries for use in lookup operations typically for, but not limited to packet processing operations including, but not limited to implementing access control lists and other functions.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches, etc.) to support these new protocols and services. However, known software and firmware implementations are relatively slow, and typically place a performance bound which may be incompatible with new requirements. Various applications that use packet classification, such as Security Access Control, Quality of Service, etc., typically need to perform many matches on source and destination port numbers, protocol and/or other header fields, etc. in order to identify a corresponding netflow.

In a known prior system, one or more fields are extracted from a received packet. These one or more extracted fields typically include source and destination addresses, port numbers, and possibly other fields, typically included in the header or flow label of a packet. These extracted fields are provided in their native format, possibly along with other data, to a CAM, which performs a lookup operation in performing the packet classification. Because CAMs are expensive, especially in terms of space and power consumption and are limited in the width of an input lookup word, one known system preprocesses, via one or more logical functions or operations, certain information contained in a packet to generate a vector that is used as part of a lookup word. This vector reduces the number of bits that would be required if the entire native information was included in the lookup word.

Many hardware implementations use ternary content addressable memories (TCAMs) to implement ACLs. TCAMs have worked well as they implement order dependent ACLs efficiently. However, TCAMs suffer from many problems that are becoming critical with faster and bigger designs going forward. TCAMs have minimal latency, but consume lot of power and generate a lot of heat, which is typically proportional to the width and activity of the TCAM. Moreover, designers of systems increasingly desire to perform lookup operations on strings of longer length, such as that caused by switching from 32 bit IPv4 addresses to 128 bit IPv6 addresses, while the widths of lookup words for associative memories remain comparatively small. New methods and apparatus are needed to perform lookup operations.

SUMMARY OF THE INVENTION

Methods and apparatus are disclosed for mapping fields of entries into new values and combining these mapped values into mapped entries for use in lookup operations typically for, but not limited to packet processing operations including, but not limited to implementing access control lists and other functions. One embodiment identifies a list including multiple items, each of the multiple items including a first field and a second field. Each unique first field is mapped to a mapped first field. Each unique second field is mapped to a mapped second field. A first associative memory is programmed with each unique first field, and a first stage memory is programmed with the mapped first fields at corresponding locations in the memory. A second associative memory is programmed with each unique second field, and a second stage memory is programmed with the mapped second fields at corresponding locations in the memory. A second stage associative memory is then programmed with entries based on the mapped first and second fields of items, with a programmed entry corresponding to one or more of the original entries.

One embodiment processes packets based on a result generated from lookup operations based on fields of a packet. In one embodiment, a packet is received which includes particular first and second values. A first lookup operation is performed based on the particular first value in the first associative memory to generate a first hit, and a first memory lookup operation is performed based on the first hit to generate a first mapped packet field value. A second lookup operation is performed based on the particular second value in the second associative memory to generate a second hit, and a second memory lookup operation is performed based on the second hit to generate a second mapped packet field value. A third lookup operation is then performed on the second stage associative memory based on the first and second mapped packet field values to generate a third hit; and processing the packet based on the third hit, including possibly the result of a memory lookup operation based on the third hit.

One embodiment includes a first associative memory, which includes the unique first fields of multiple items of a list, the first associative memory is configured to generate a first hit. A first memory is coupled to the first associative memory, the first memory includes mapped first values corresponding to the unique first fields of the multiple items, the first memory is configured to generate a first mapped lookup value based on the first hit. A second associative memory includes the unique second fields of the multiple items, the second associative memory is configured to generate a second hit. A second memory is coupled to the second associative memory, with the second memory including mapped second values corresponding to the unique second fields of the multiple items, and the second memory is configured to generate a second mapped lookup value base on the second hit. A third associative memory is coupled to the first memory and the second memory. The third associative memory is programmed with entries including mapped first value and mapped second values based on the multiple items of the list. The third associative memory is configured to generate a resultant hit based on a lookup word including the first and second mapped lookup values.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for mapping fields of entries into new values and combining these mapped values into mapped entries for use in lookup operations typically for, but not limited to packet processing operations including, but not limited to implementing access control lists and other functions. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Access control entries (ACEs) generally contain a lot of common patterns, which typically may occur because many ACEs ignore some part of the ACE. For example, analyzing one ACL having approximately 2500 ACEs for an operational web-based offering shows that less than 100 source Internet Protocol (IP) patterns are actually used, and is the same for other fields (e.g., destination IP addresses, protocols, etc.) However, as many of the ACEs contain multiple fields, the combinations of these fields typically generates many combinations of the used fields. Also, the space required in TCAMs programmed to implement the ACL is typically a function of the higher number of ACEs in an ACL or the combinations of the fields, and each entry of in a TCAM is typically the sum of the width of each field, which is expensive especially in terms of power and space consumption, as well as possibly exceeding the width of available TCAMs.

Methods and apparatus are disclosed for mapping fields of entries into new values and combining these mapped values into mapped entries for use in lookup operations typically for, but not limited to packet processing operations including, but not limited to implementing access control lists (ACLs) and other functions. Separate TCAMs could be used for different parts of the ACE to reduce total TCAM usage. For example, different (32 bit wide) TCAMs are used to match source and destination IP address (rather than a 72 bit wide TCAM for matching both) with the width of the TCAM results being much smaller than the width of the original fields used to produce the result. Results of these multiple TCAMs are then used in a lookup operation in a TCAM, a Range CAM or Mtrie to generate the actual result which can be used for packet processing, or for any other purpose and in any other application in a computer or communications system. Typically herein, embodiments are described herein in terms of packet processing. However, the invention is not so limited, and can be used in an unlimited number of contexts and application which use matching operations on fields of information.

In one embodiment, fields of entries are mapped into new values with these mapped values combined into mapped entries for use in lookup operations typically for packet processing. First, a list including multiple items each having a first field and a second field is identified. The first and second fields are respectively mapped to mapped first and second fields. A first associative memory is programmed with the unique first fields of the multiple items, and a first stage memory is programmed with the mapped first fields at corresponding locations. A second associative memory is programmed with the unique second fields of the multiple items, and a second stage memory is programmed with the mapped second fields at corresponding locations. A second stage associative memory is programmed with entries including the mapped first and second fields corresponding to one or of the multiple items.

Figure 1:
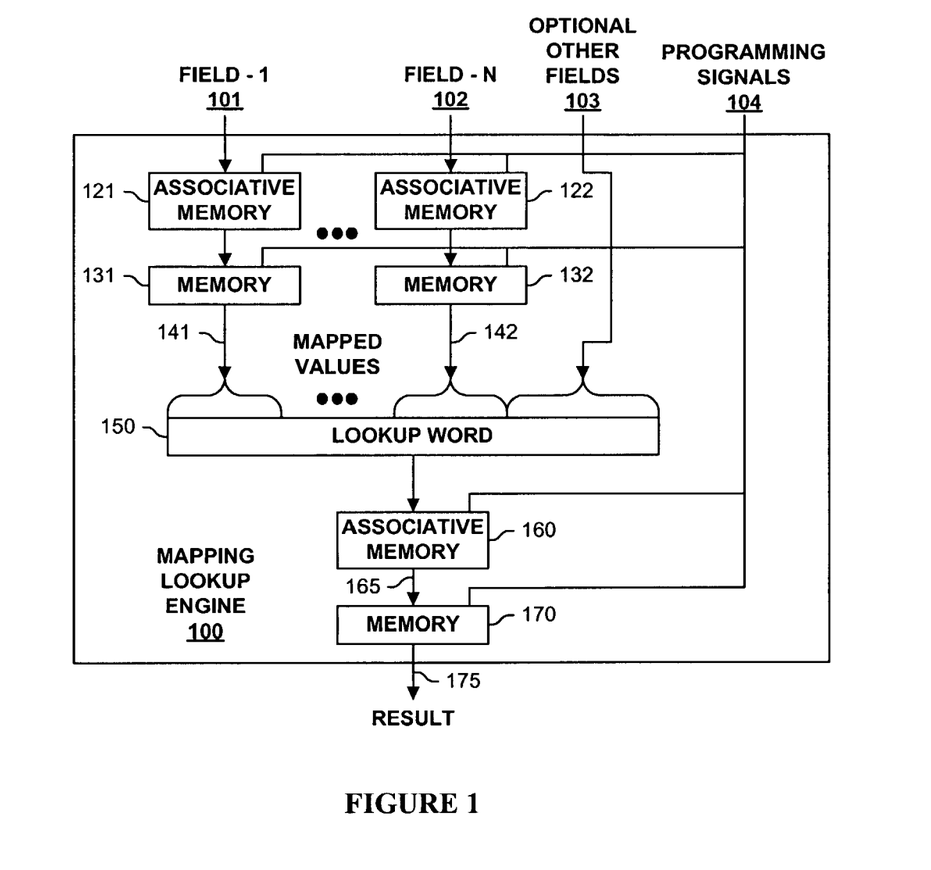
FIG. 1 is a block diagram of a mapping lookup engine used in one embodiment.

FIG. 1 is a block diagram of a mapping lookup engine 100 used in one embodiment for generating a result 175 based on one or more fields 101-102 and possibly one or more optional other fields 103. As shown, associative memories 121-122 and 160 and adjunct memories 131-132 and 170 are programmed based on programming signals 104. Then, one or more fields 101-102 are each provided to one of the associative memories 121-122, with their hit results respectively used to perform a lookup operation in one or more memories 131-132 to generate one or more mapped values 141-142. A lookup word 150 is formed using the generated one or mapped values 141-142 and possibly optional other fields 103. Note, lookup word 150 could be stored (e.g., in a register, queue, or any other mechanism) or provided directly or delayed via circuitry to second stage associative memory 160 which performs a lookup operation on lookup word 150 to produce result 165. In one embodiment, one or more operations (e.g., packet processing) is then performed based on result 165. In one embodiment, these operations or processing include performing a lookup operation in memory 170 based on result 165 to produce result 175.

Figure 2:
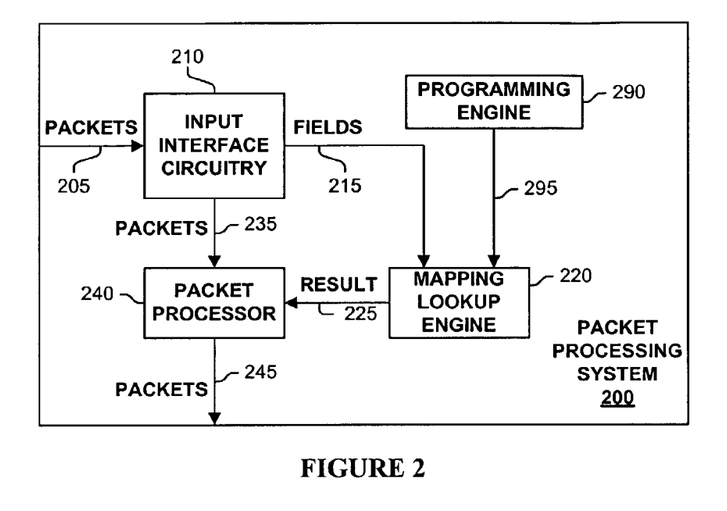
FIG. 2 is a block diagram of a packet processing system including a mapping lookup engine used in one embodiment.

FIG. 2 illustrates a packet processing system 200 including a mapping lookup engine 220 used in one embodiment. Programming engine 290 programs mapping lookup engine 220 via programming signals 295. Programming engine 290 may be any mechanism for generating programming signals and/or information including, but not limited to discrete circuitry, ASICs, processing engines, etc. Packets 205 are received by input interface circuitry 210. One or more fields 215 are then typically provided for each packet to mapping lookup engine 220, with results 225 typically being generated for each packet. Packet processor 240 receives the original packets 235 (or a subset thereof), and processes these packets 235 based on received results 225. Should the action include forwarding the packet to another component or system, packet processor 240 forwards packets 245.

Figure 3:
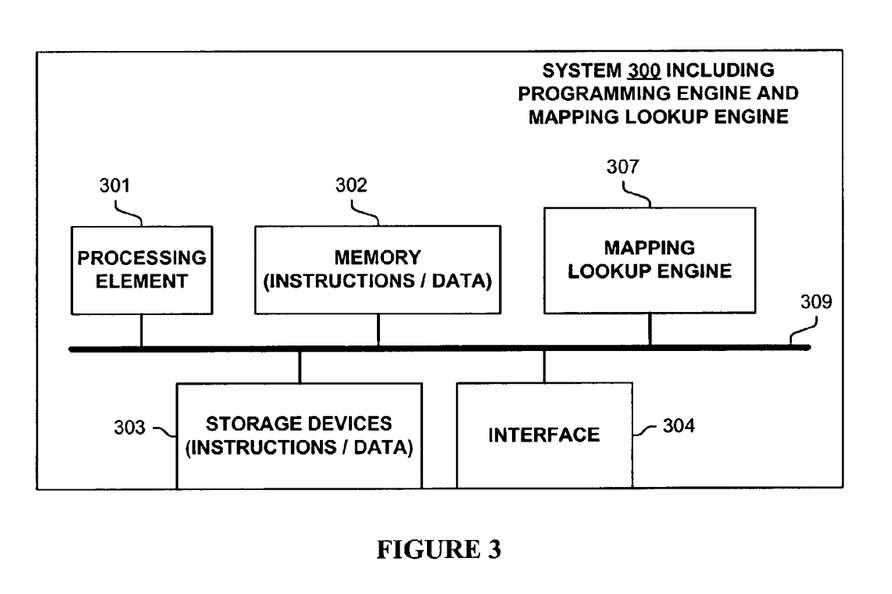
FIG. 3 is a block diagram of a system including a programming engine and a mapping lookup engine used in one embodiment.

FIG. 3 is a block diagram of a system 300 including a programming engine (using processing element 301) and mapping lookup engine 307 used in one embodiment. In one embodiment, system 300 includes processing element 301, memory 302 and possibly other storage devices 303, mapping lookup engine 307, and interface 304, which are coupled via one or more communications mechanisms 309 (shown as a bus for illustrative purposes). Interface 304 is typically used to connect to a packet processor or other systems or components for manipulating information or packets based on results generated by mapping lookup engine 307. Additionally, mapping lookup engine 307 could be directly or indirectly connected to these other systems or components via any mechanism.

Various embodiments of system 300 may include more or less elements. For example, mapping lookup engine 307 could be located remotely. Mapping lookup engine is typically programmed by processing element 301 using memory 302 and/or storage devices 303. This programming may be based on an ACL, routing information, or based on any other data and for any purpose. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with one embodiment of the invention. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with one embodiment of the invention.

Figure 4A:
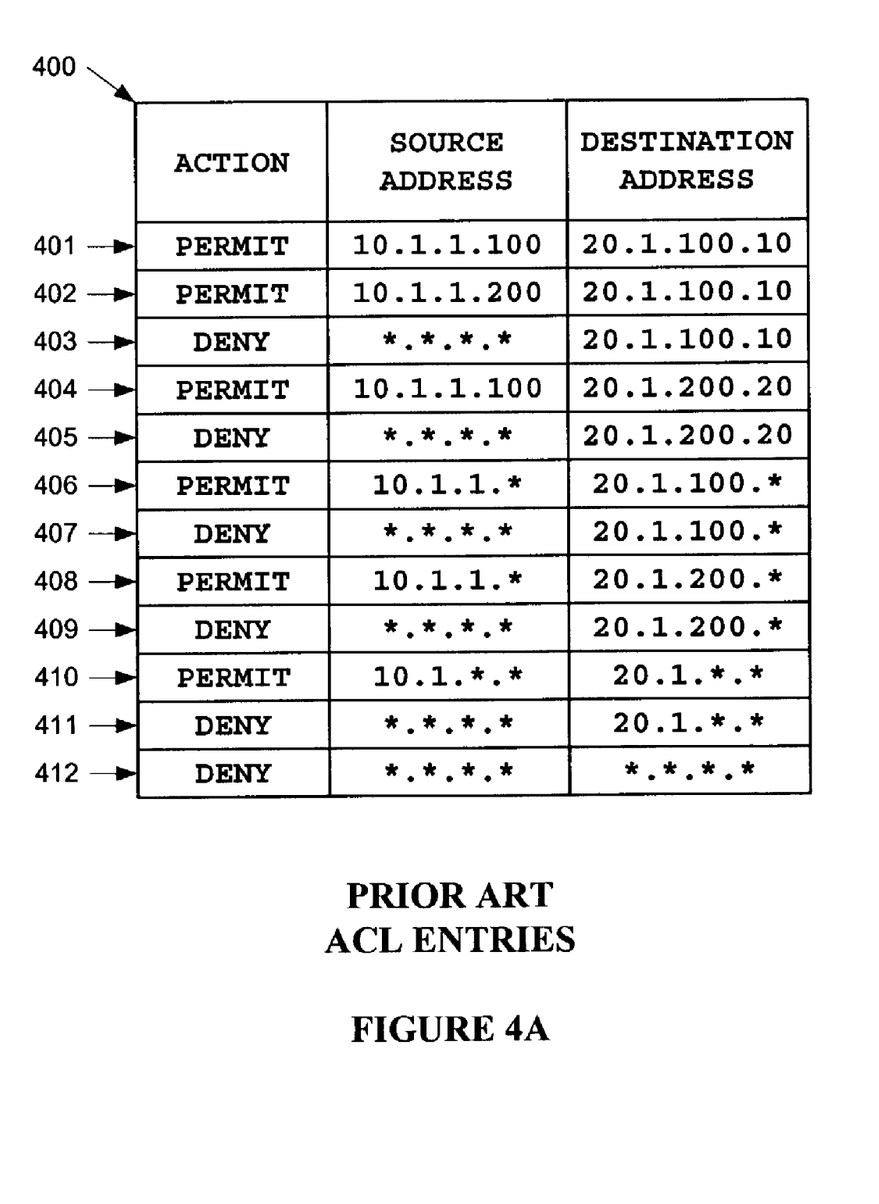
FIG. 4A is a prior-art list of access control list entries.

FIG. 4A illustrates a prior-art list 400 of access control list entries 401-412, each indicating a source address, destination address, and desired action. Note, in list 400, there are twelve entries.

Figure 4B:
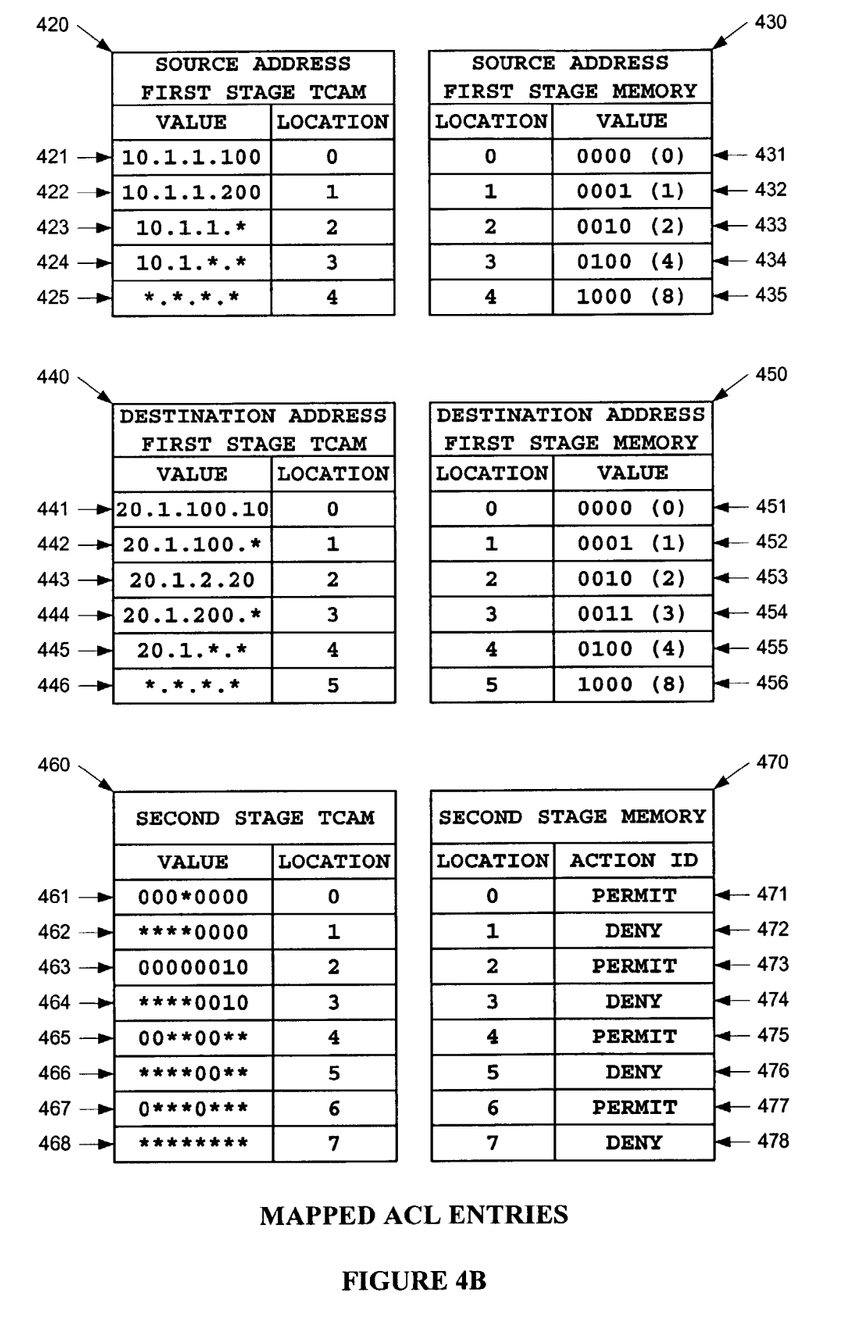
FIG. 4B illustrates a resultant mapping generated by one embodiment based on the original list of access control list entries shown in FIG. 4A.

FIG. 4B illustrates a resultant mapping generated by one embodiment based on the original list of access control list entries (ACEs) shown in FIG. 4A. A first TCAM 420 is programmed with the list of entries 421-425, which correspond to the values of the source address field in ACEs 401-412 (FIG. 4A) with duplicates removed. Note, entries 421-425 are arranged so that wildcard entries that match other entries are below the matching other entries so that the more specific value will be matched. (Of course, the ordering/arrangement of the entries 421-425 matches the operation of TCAM 420 in producing the hit indication.) Adjunct memory 430, corresponding to TCAM 420, is programmed with mapped values in entries 431-435 at corresponding locations to the programming of entries 421-425 in TCAM 420.

In one embodiment, these mapped values are determined by generating groupings of entries based on entries containing a wildcard and the other entries that match the wildcard entry. For each grouping, the entries are mapped to new values such that the other entries are uniquely identifiable, but the entry containing the wildcard and the other entries will be matched by a value containing wildcards, while not matching entries in other groupings. Groups of entries can be formed which contain no wildcards, with individual entries assigned in a correspond range. For example, entries 421-423 of TCAM 420 are mapped to entries 431-433 of adjunct memory 430, with the corresponding values being 0000, 0001, and 0010. Thus, a subsequent stage associative memory could be programmed with 0000, 0001, and 00** to appropriately match all three of these mapped values. Note, in this example, a 32-bit address is mapped to a 4-bit value (of course, the width of the value depends on the number of entries supported). Also note, that values assigned in entries 431-435 are not contiguous, rather assigned to allow wildcard mapping of related entries.

Similarly, destination address fields of ACEs 401-412 (FIG. 4A) are programmed in TCAM 440 as entries 441-446 with duplicates removed. Adjunct memory 450 is programmed with mapped values in corresponding entries 451-456 in the same manner as for adjunct memory 430.

Next, second (or next) stage TCAM 460 is programmed based on the original list of entries 401-412 (FIG. 4A). Each entry 461-468 corresponds to one or more entries 401-412, with the programmed values corresponding to mapped values contained in entries 431-435 of adjunct memory 430, and entries 451-452 of adjunct memory 450. For example, entry 461 of TCAM 460 correspond to entries 401-402 of original access control list 400. Typically, adjunct memory 470 is programmed with the resultant action to be performed or some other indication in entries 471-478, which correspond to the action defined in entries 401-412 of the original ACL 400. Note, for this example, the number of resultant entries in TCAM 460 is eight, wherein a TCAM directly programming ACL entries 401-412 would require twelve.

Figure 5A:
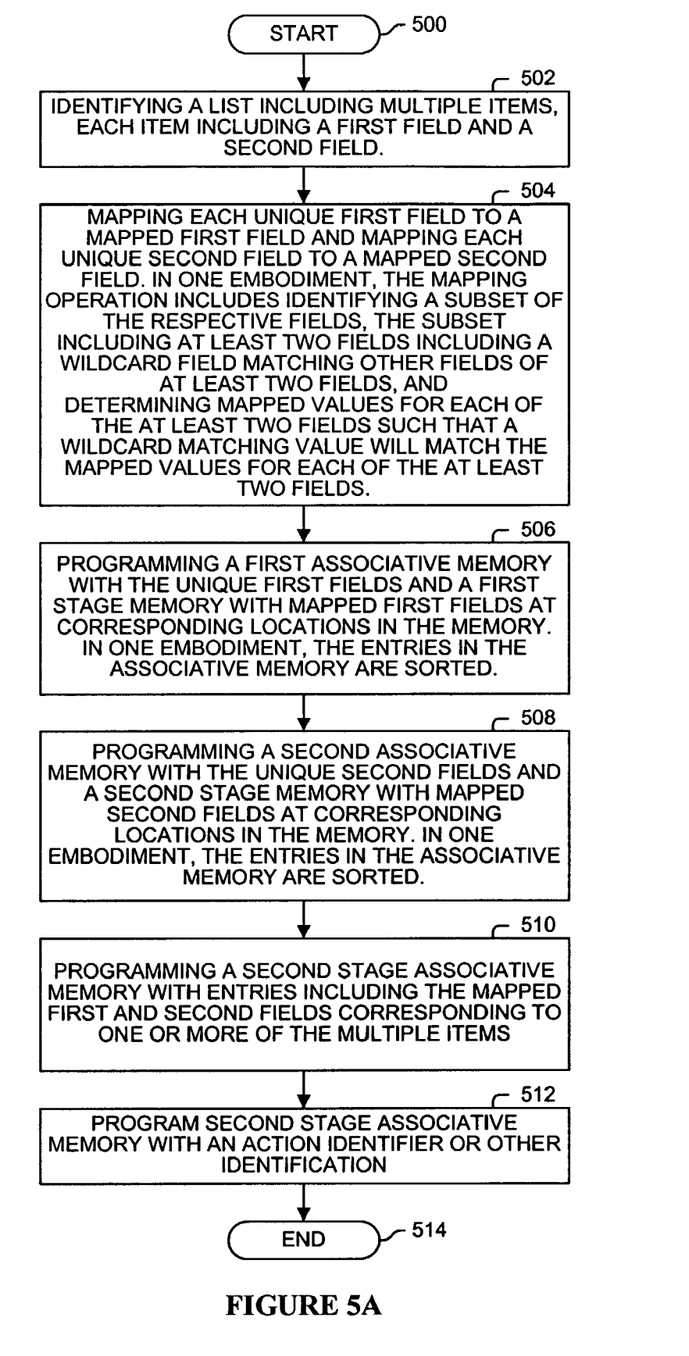
FIG. 5A illustrates a process used in one embodiment for mapping fields of entries into new values and combining these mapped values into mapped entries for use in lookup operations.

FIG. 5A illustrates a process used in one embodiment for mapping fields of entries into new values and combining these mapped values into mapped entries for use in lookup operations. Processing begins with process block 500, and proceeds to process block 502, wherein a list including multiple items is identified. Each item includes a first and a second field.

Next, in process block 504, each unique first field is mapped to a mapped first field value, and each unique second field is mapped to a mapped second field value. Note, redundant values are typically not included. In one embodiment, this mapping operation includes identifying a subset of the respective fields, the subset including at least two fields including a wildcard field matching other fields of the at least two other fields. Then, mapped values are determined for the subset/grouping such that a wildcard entry will match all the fields in the subset, while the other fields are uniquely identifiable. Note, this can be a recursive process wherein subsets/groupings are contained within other subsets/groupings.

Next, in process block 506, a first associative memory is programmed with the unique first fields, and a corresponding adjunct memory is programmed with the mapped first fields at corresponding locations. In one embodiment, the entries programmed into the TCAM are stored in a sorted or other order such that an entry matching another entry containing a wildcard will given priority in the matching process. Similarly, in process block 508, a second associative memory is programmed with the unique second fields, and a corresponding adjunct memory is programmed with the mapped second fields at corresponding locations. Then, in process block 510, a second stage associative memory is programmed with an entry including the mapped first and second fields corresponding to one or more of the multiple items of the original list identified in process block 502. In process block 512, a second stage adjunct memory is programmed with corresponding actions to be taken based on a match. Processing is complete as indicated by process block 514.

Figure 5B:
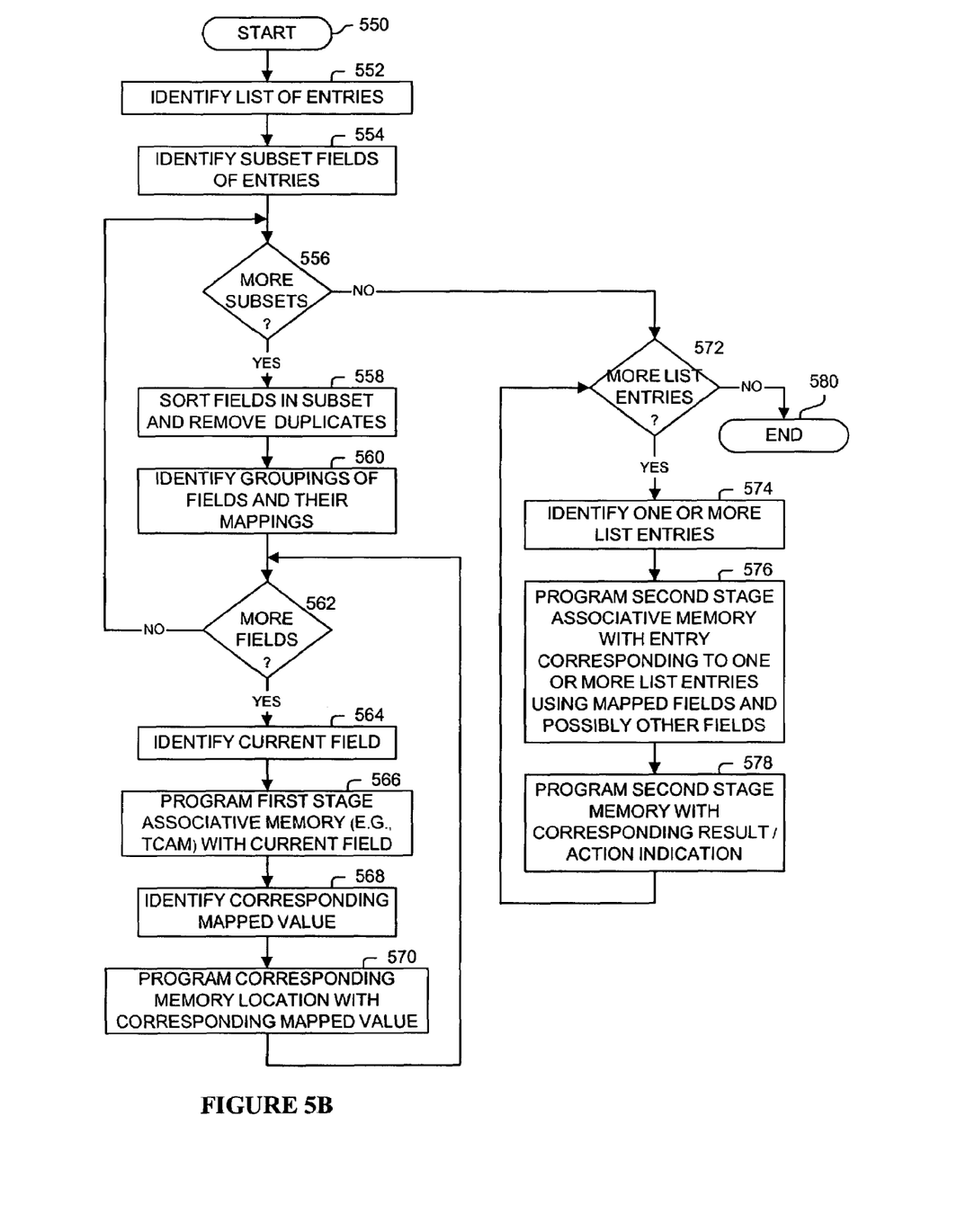
FIG. 5B illustrates a process used in one embodiment for mapping fields of entries into new values and combining these mapped values into mapped entries for use in lookup operations.

FIG. 5B illustrates a process used in one embodiment for mapping fields of entries into new values and combining these mapped values into mapped entries for use in lookup operations. Processing begins with process block 550, and proceeds to process block 552, wherein a list of entries is identified. Next, in process block 554, the subset fields to be mapped for each of the entries are identified.

While there are more subset fields to be processes as determined in process block 556 (e.g., for each subset field, perform the mapping and programming steps of 558-570), processing proceeds to process block 558, wherein the fields are sorted with duplicate fields removed. Then, in process block 560, the groupings of unique values, typically with a same action identifier (e.g., permit, deny, etc.), and their corresponding mapped values are identified typically based on the ability to use wildcards when programming a next stage associative memory. (Note, there can be groupings within groupings.) While there are more fields to be processed as determined in process block 562, a current field is identified in process block 564, and a first stage associative memory is programmed based on the current field in process block 566. In process block 568, the mapped value corresponding to the current entry is identified, and in process block 570, an adjunct memory is programmed with this mapped value at a corresponding location. Processing then returns to process block 562.

After each subset of fields has been processed as determined in process block 556, processing proceeds to process block 572. While there are more entries in the original list to process, one or more current list entries are identified in process block 574. In process block 576, a second (or next) stage associative memory (e.g., TCAM or Mtrie) is programmed with an entry corresponding to the one or more current list entries using corresponding mapped values for each of the mapped fields, along with any other value based on other fields. Next, in process block 578, a corresponding adjunct memory is programmed with a corresponding result or action indication. Processing returns to process block 572. When there is no more entry of the original list remaining to be processed, processing is complete as indicated by process block 580.

Figure 6:
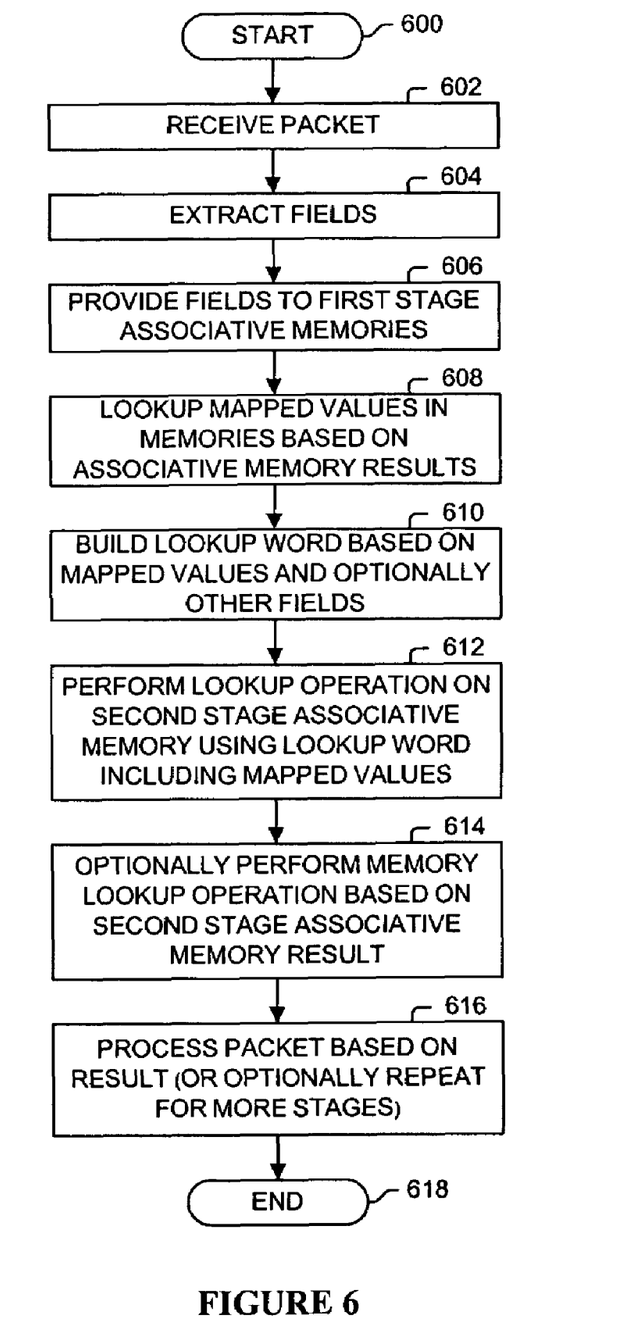
FIG. 6 illustrates a process used in one embodiment for processing a packet based on a series of lookup operations including one or more sets of mapped values.

FIG. 6 illustrates a process used in one embodiment for processing a packet based on a series of lookup operations including one or more sets of mapped values. Processing begins with process block 600, and proceeds to process block 602, wherein a packet is received. In process block 604, fields are extracted, and in process block 606, a subset of these fields (possibly including all fields) are provided to corresponding first stage associative memories. Next, in process blocks 608-610, the mapped fields are determined based on a lookup operation in each of the corresponding first stage associative memories and a lookup operation on the corresponding adjunct memory based on the hit indication of the corresponding associative memory. Next, in process block 612, a lookup operation is performed on a second or next stage associative memory based on a lookup word including the determined mapped values and possibly other fields to generate a result. In process block 614, an optional lookup operation is performed on a corresponding adjunct memory based on the result to possibly modify or replace the value of the result. Next, in process block 616, the packet is processed or a portion (e.g., process blocks 606-614) of this process is repeated for multiple stages. Processing is complete as indicated by process block 618.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:

identifying a plurality of items, each item of the plurality of items including a first field and a second field;

mapping each unique first field of the plurality of items to a mapped first field;

mapping each unique second field of the plurality of items to a mapped second field;

programming a first associative memory with said unique first fields and a first stage memory with said mapped first fields at corresponding locations in the first stage memory;

programming a second associative memory with said unique second fields and a second stage memory with said mapped second fields at corresponding locations in the second stage memory; and programming for each particular item of the plurality of items a second stage associative memory with an entry based on the mapped first field and the mapped second field corresponding to the particular item.

2. The method of claim 1, wherein said mapping each unique first field includes determining mapped first values for each of at least two of said unique first fields such that a first matching value including a wildcard will match said mapped first values for said each of said at least two of said unique first fields.

3. The method of claim 2, wherein said mapping each unique second field includes determining mapped second values for each of at least two of said unique second fields such that a second matching value including a wildcard will match said mapped second values for said each of said at least two of said unique second fields.

4. The method of claim 1, wherein each entry of the second stage associative memory includes a field other than the first and second mapped fields.

5. The method of claim 1, further comprising:
receiving a packet including a particular first value and a particular second value;
performing a first lookup operation on the first associative memory to generate a first hit;
performing a first memory lookup operation based on the first hit to generate a first mapped packet field value;
performing a second lookup operation on the second associative memory to generate a second hit;
performing a second memory lookup operation based on the second hit to generate a second mapped packet field value;
performing a third lookup operation on the second stage associative memory based on the first and second mapped packet field values to generate a third hit; and
processing the packet based on the third hit.

6. The method of claim 5, wherein said processing the packet based on the third hit includes: performing a third memory lookup operation based on the third hit to generate an action identifier; and routing or filtering the packet based on the action identifier.

7. The method of claim 5, wherein the first value includes a source address, a destination address, or a port value.

8. The method of claim 5, wherein the first value includes a source address and the second value includes a destination address.

9. One or more tangible computer-readable media encoded thereon with computer-executable instructions for performing operations when executed by one or more processing elements, said operations comprising:
identifying a plurality of items, each item of the plurality of items including a first field and a second field;
mapping each unique first field of the plurality of items to a mapped first field;
mapping each unique second field of the plurality of items to a mapped second field;
programming a first associative memory with said unique first fields and a first stage memory with said mapped first fields at corresponding locations in the first stage memory;
programming a second associative memory with said unique second fields and a second stage memory with said mapped second fields at corresponding locations in the second stage memory; and
programming for each particular item of the plurality of items a second stage associative memory with an entry based on the mapped first field and the mapped second field corresponding to the particular item.

10. The computer-readable media of claim 9, wherein said mapping each unique first field includes determining mapped first values for each of at least two of said unique first fields such that a first matching value including a wildcard will match said mapped first values for said each of said at least two of said unique first fields.

11. The computer-readable media of claim 10, wherein said mapping each unique second field includes determining mapped second values for each of at least two of said unique second fields such that a second matching value including a wildcard will match said mapped second values for said each of said at least two of said unique second fields.

12. An apparatus comprising:
a first associative memory including first fields of a plurality of items of a list, the first associative memory configured to generate a first hit;
a first memory, coupled to the first associative memory, the first memory including mapped first values corresponding to said first fields of the plurality of items, the first memory configured to generate a first mapped lookup value based on the first hit;
a second associative memory including second fields of the plurality of items, the second associative memory configured to generate a second hit;
a second memory, coupled to the second associative memory, the second memory including mapped second values corresponding to said second fields of the plurality of items, the second memory configured to generate a second mapped lookup value base on the second hit; and
a third associative memory, coupled to the first memory and the second memory, the third associative memory programmed with a plurality of third associative memory entries, the third associative memory configured to generate a resultant hit based on a lookup word including the first mapped lookup value and the second mapped lookup value.

13. The apparatus of claim 12, wherein a first portion of a particular entry of the plurality of third associative memory entries includes a wildcard, the first portion matching two or more of said mapped first values.

14. The apparatus of claim 13, wherein a second portion of the particular entry of the plurality of third associative memory entries includes a wildcard, the second portion matching two or more of said mapped second values.

15. An apparatus comprising:
means for identifying a plurality of items, each item of the plurality of items including a first field and a second field;
means for mapping each unique first field of the plurality of items to a mapped first field;
means for mapping each unique second field of the plurality of items to a mapped second field;
means for programming a first associative memory with said unique first fields and a first stage memory with said mapped first fields at corresponding locations in the first stage memory;
means for programming a second associative memory with said unique second fields and a second stage memory with said mapped second fields at corresponding locations in the second stage memory;
means for programming for each particular item of the plurality of items a second stage associative memory with an entry based on the mapped first field and the mapped second field corresponding to the particular item.

16. The apparatus of claim 15, wherein said means for mapping each unique first field includes means for determining mapped first values for each of at least two of said unique first fields such that a first matching value including a wildcard will match said mapped first values for said each of said at least two of said unique first fields.

17. The apparatus of claim 16, wherein said means for mapping each unique second field includes means for determining mapped second values for each of at least two of said unique second fields such that a second matching value including a wildcard will match said mapped second values for said each of said at least two of said unique second fields.

18. The apparatus of claim 15, wherein each entry of the second stage associative memory includes a field other than the first and second mapped fields.

19. The apparatus of claim 15, further comprising:
    means for receiving a packet including a particular first value and a particular second value;
    means for performing a first lookup operation on the first associative memory to generate a first hit;
    means for performing a first memory lookup operation based on the first hit to generate a first mapped packet field value;
    means for performing a second lookup operation on the second associative memory to generate a second hit;
    means for performing a second memory lookup operation based on the second hit to generate a second mapped packet field value;
    means for performing a third lookup operation on the second stage associative memory based on the first and second mapped packet field values to generate a third hit; and
    means for processing the packet based on the third hit.

20. The apparatus of claim 19, wherein said means for processing the packet based on the third hit includes: means for performing a third memory lookup operation based on the third hit to generate an action identifier.

21. The apparatus of claim 19, wherein the first value includes a source address, a destination address, or a port value.

22. The apparatus of claim 19, wherein the first value includes a source address and the second value includes a destination address.

* * * * *